(12) United States Patent
Metzger et al.

(10) Patent No.: US 7,720,653 B2
(45) Date of Patent: May 18, 2010

(54) MATHEMATICAL MODEL FOR A METALLURGICAL PLANT, AND METHOD FOR OPTIMIZING THE OPERATION OF A METALLURGICAL PLANT USING A MODEL

(75) Inventors: Michael Metzger, Erlangen (DE); Albrecht Sieber, Möhrendorf (DE); Uwe Stürmer, Baiersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 198 days.

(21) Appl. No.: 11/201,712

(22) Filed: Aug. 11, 2005

(65) Prior Publication Data

US 2005/0267612 A1    Dec. 1, 2005

Related U.S. Application Data

(63) Continuation of application No. PCT/EP2004/001076, filed on Feb. 5, 2004.

(30) Foreign Application Priority Data

Feb. 14, 2003   (DE)   ................. 103 06 273

(51) Int. Cl.
G06F 7/60   (2006.01)
G06F 7/48   (2006.01)

(52) U.S. Cl. .............................. 703/2; 703/6
(58) Field of Classification Search ............ 703/2, 703/6, 7
See application file for complete search history.

(56) References Cited

U.S. PATENT DOCUMENTS 6,438,430 B1 * 8/2002 Martin et al. ................ 700/28

2002/0156542 A1 * 10/2002 Nandi ........................ 700/30

FOREIGN PATENT DOCUMENTS

| DE | 195 08 476 A1 | 9/1996 |
| DE | 197 06 767 A1 | 9/1998 |
| DE | 199 12 221 A1 | 2/2000 |

(Continued)

OTHER PUBLICATIONS

Khosrow Nikkhah and Corby Anderson, Role of Simulation Software in Design and Operation of Metallurgical Plants: A Case Study, 2001.*

(Continued)

*Primary Examiner*—Paul L Rodriguez
*Assistant Examiner*—Eunhee Kim
(74) *Attorney, Agent, or Firm*—King & Spalding L.L.P.

(57) ABSTRACT

A method for optimizing the operation of a metallurgical plant using a model by modeling supply and discharge media streams, predetermining structure parameters which define the media streams, linking the media streams to one another, predetermining starting parameters which describe initial states, predetermining input operating parameters, determining and outputting output operating parameters, and determining and outputting end parameters, which describe end states of the units, by the model, predetermining the structure parameters to an optimization computer by a user and transmitting the parameters from the optimization computer to a model, and determining optimized operating parameters by the optimization computer on the basis of the starting parameters and an assessment criterion in accordance with an optimization algorithm using the model, wherein the assessment criterion is predetermined to the optimization computer by the user.

10 Claims, 5 Drawing Sheets

FOREIGN PATENT DOCUMENTS

| WO | WO 99/46646 | 9/1999 |
|---|---|---|
| WO | WO 01/61573 | 8/2001 |

OTHER PUBLICATIONS

Brian G. Thomas and J. Keith Brimacombe, Chapter 8. Process Modeling (Advanced Physical Chemistry for Process Metallurgy), pp. 253-279, 1997.*

International Research Report, PCT/EP2004/001076, 6 pp, Aug. 2, 2004.

Fleissig P., et al.; "Vergleichmäßigung des Strombezugs bei Großverbrauchern mit Hilfe eines Energiemodells", Elektrowärme International, Bd. 2; pp. 94-101, Jun. 1997.

Krumm, Wolfgang; FETT Franz (u.a.): "Optimization of the Energy Distribution in an Integrated Metallurgical Plant", Energy Industry 1988, vol. 108, No. 22, 11 Pages, Oct. 1988.

* cited by examiner

US 7,720,653 B2

MATHEMATICAL MODEL FOR A METALLURGICAL PLANT, AND METHOD FOR OPTIMIZING THE OPERATION OF A METALLURGICAL PLANT USING A MODEL

CROSS-REFERENCE TO RELATED APPLICATIONS

This application is a continuation of co-pending International Application No. PCT/EP2004/001076 filed Feb. 5, 2004, which designates the United States and claims priority to German Application No. DE 103 06 273.4 filed Feb. 14, 2003, the contents of which are hereby incorporated by reference in their entirety.

TECHNICAL FIELD

The present invention relates to a mathematical model for a metallurgical plant.

The present invention also relates to a method for optimizing the operation of a metallurgical plant using a model of this type, in which an optimization computer determines optimized operating parameters on the basis of the starting parameters and an assessment criterion in accordance with an optimization algorithm using the model.

Finally, the present invention also relates to a computer program stored on a data carrier for carrying out an optimization method of this type and to the optimization computer itself.

BACKGROUND

Models for metallurgical plants and methods for optimizing the operation of a metallurgical plant using a model of this type are generally known. By way of example, mention may be made of the following:

the specialist article "Optimierung der Energieverteilung im integrierten Hüttenwerk" by Wolfgang Krumm, Franz N. Fett, Hans-Günther Pöttken and Herbert Strohschein, [Optimizing the Energy Distribution in Integrated Metalurgical plant], published in Stahl und Eisen 108 (1988) No. 22, pages 95 to 104, and the specialist article "Vergleichmäßigung des Strombezugs bei Großverbrauchern mit Hilfe eines Energiemodells" by P. Fleissig and F. N. Fett, [Evening Out the Electricity Consumption of Large Consumers with the Aid of an Energy Model] published in elektrowärme international, Volume B 2, June 1997, pages B 94 to B 101.

The content of disclosure of these two publications is hereby incorporated in the present application by reference to the publications.

The models and optimization algorithms of the prior art per se already work fairly satisfactorily. However, they suffer from the problem of being rigid and inflexible.

SUMMARY

The object of the present invention is to alleviate this drawback.

The object is achieved, for the model described in the introduction, by virtue of the fact that structure parameters which define at least the number and type of the units can be predetermined as variables for the model, and that the media streams are linked to one another on the basis of the structure parameters.

A simulating model may, thus, comprise: a number of units of the metallurgical plant having assigned media streams to be supplied and discharged, which can be modeled by means of the model, wherein the media streams are fixedly or flexibly linked to one another within the model, in such a manner that each media stream which is to be fed to one of the units is fed to the respective unit either from outside the plant or from another of the units, and each media stream discharged by one of the units is discharged either to outside the plant (6) or to another of the units, wherein starting parameters which describe initial states of the units are predetermined as variables for the model, wherein input operating parameters, which describe a first part of the media stream profiles, can be predetermined as variables for the model, wherein output operating parameters, which describe the remainder of the media stream profiles, are determined and outputted by the model, and wherein end parameters, which describe end states of the units, are determined and outputted by the model.

For the optimization method described in the introduction, the object is achieved by virtue of the fact that the structure parameters are predetermined to the optimization computer by a user and are transmitted from the optimization computer to the model.

The energy streams preferably comprise both material streams and energy and energy carrier streams, since in this case the model can be implemented in a particularly flexible way.

If the operating parameters also include quality profiles for the media stream profiles, it is even more flexible.

The complexity of the overall model, with a fundamentally unchanged plant, can be adapted to the available capacity of a computer if the structure parameters can be used to predetermine not only the type of units but also how the units are linked to one another and/or what submodels are used to model the units.

A further possible way of adapting to the computer power available consists in the media stream profile extending over a period of time which can be predetermined as a variable for the model.

Predetermining the submodels and predetermining the period of time may if appropriate be combined with one another in a suitable way. By way of example, for off-line calculations, the period of time and complexity can be ramped up, for example to a period of time of one week and a high complexity of the submodels. If the computer used requires a calculation time of, for example, two days for these calculations, this is not critical since the calculations are being carried out offline.

On the other hand, if on-line calculation is to be carried out, by way of example the period of time can be set at just one hour and the complexity of the submodels can be reduced to "medium" or "simple". In this case, the computer needs, for example, only 20 minutes for the preliminary calculation, so that there is still sufficient time for any process-influencing measures required to be implemented.

If the user predetermines to the optimization computer which of the media stream profiles are input operating parameters and which are output operating parameters, the user can determine which operating parameters are to be optimized, since only the input operating parameters are varied by the optimization computer. On the other hand, the output operating parameters are determined by the model.

If the assessment criterion is also predetermined to the optimization computer by the user, the optimization method is even more flexible, since it is then also possible to predetermine what criterion is to form the basis for the optimization.

If the assessment criterion can be predetermined in such a manner that, for at least one media stream profile discharged to outside the plant, it is satisfied more successfully the lower this media stream profile, it is also possible to take account of "negative criteria". This applies in particular if this media stream profile is a material stream (e.g. off-gas, pollutant, slag).

The assessment criterion can preferably also be predetermined in such a manner that it is satisfied more successfully if a quality profile of a first media stream profile fed to the plant from outside drops and, as a corollary to this, a second media stream profile fed to the plant from outside increases on account of the drop in the quality profile of the first media stream profile, since it is then possible in particular also to optimize what is known as media substitution.

The latter optimization is advantageous in particular if the first media stream profile is a material stream profile (e.g. iron ore intended for a blast furnace) and the second media stream profile is an energy or energy carrier stream profile (e.g. coke required for melting the iron out of the ore).

The optimization method works even more flexibly if the optimization algorithm is predetermined to the optimization computer by the user.

Even more flexibility results if the period of time is predetermined to the optimization computer by the user and is transmitted by the optimization computer to the model.

BRIEF DESCRIPTION OF THE DRAWINGS

Further advantages and details will emerge from the following description of an exemplary embodiment in combination with the drawings, in which, in outline illustration.

DETAILED DESCRIPTION

Figure 1:
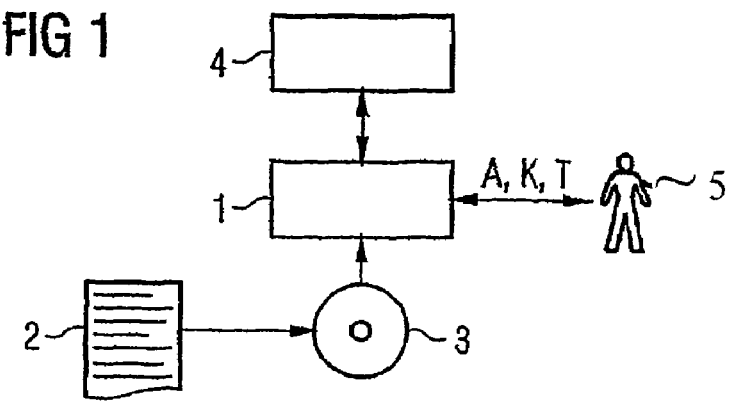
FIG. 1 shows a block diagram of an optimization computer and of a model for a metallurgical plant.

In accordance with FIG. 1, an optimization computer 1 is programmed with a computer program 2. The computer program 2 has been passed to the optimization computer 1 via a data carrier 3, e.g. a CD-ROM 3. The optimization computer 1 implements, inter alia, a mathematical model 4 of a metallurgical plant on the basis of the programming with the computer program 2. Furthermore, it uses the mathematical model 4 to carry out a method for optimizing operation of the metallurgical plant, which method is described in more detail below in conjunction with FIG. 2.

Figure 2:
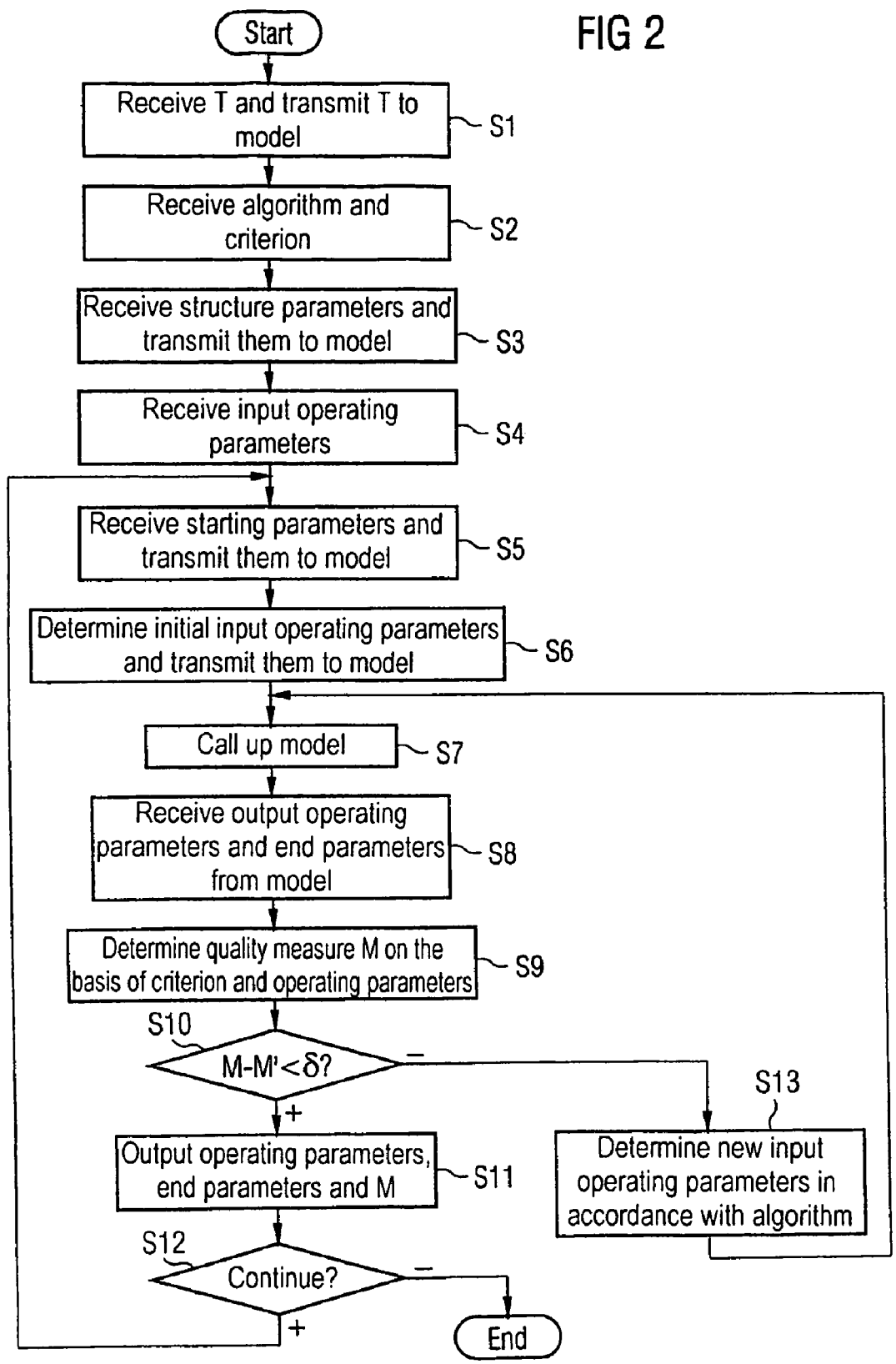

In accordance with FIG. 2, first of all a user 5, in a step S1, predetermines a period of time T to the optimization computer 1. The period of time T indicates the time over which media flow profiles extend. The period of time T is transmitted from the optimization computer 1 to the model 4. It is therefore predetermined as a variable for the model 4.

Then, the user 5 predetermines an optimization algorithm A to the optimization computer 1. By way of example, the user 5 can select one of a number of possible optimization algorithms (e.g. Simplex algorithm, SQP algorithm, etc.).

In the same step S2, the user 5 predetermines an assessment criterion K, on the basis of which the optimization computer 1 evaluates parameters which have been determined, to the optimization computer 1. The user 5 can also select, for example, one of a number of possible criteria for the assessment criterion K. By way of example, the consumption of energy and/or energy carriers can be minimized. It is also possible, for example, to minimize the peak value of the electricity consumed. It is also possible to minimize the emission of pollutants. The assessment criterion K may be linear, nonlinear and may also, for example, be dependent on the time of day. As an alternative or in addition, a multiple choice is also possible if suitable weighting factors are stipulated.

Next, the user 5, in a step S3, predetermines structure parameters to the optimization computer 1. The structure parameters define at least the type and number of units in the metallurgical plant (including the performance data thereof) which is modeled by the mathematical model 4. This will be dealt with in more detail below in conjunction with FIGS. 4 and 5. The structure parameters are likewise transmitted to the model 4 by the optimization computer 1.

Finally, in a step S4, the user 5 predetermines to the optimization computer 1 which of the media stream profiles are to be input operating parameters for the model 4 and which are to be output operating parameters. Therefore, the user 5 can predetermine to the optimization computer 1 which media stream profiles are to be varied or predetermined and which are to be determined by the model 4. The predetermination of time-dependent media stream profiles allows simulation in particular not only of steady-state operation of the metallurgical plant but also of non-steady-state operation thereof.

After these static variables, which do not change further during the optimization method, have been input, the user 5 predetermines to the optimization computer 1 starting parameters which describe initial states of the units of the metallurgical plant. These parameters too are transmitted as variables to the model 4, in step S5.

In accordance with FIGS. 1 and 2, the starting parameters are predetermined by the user 5. This is possible and necessary on account of the fact that the optimization method presented in FIGS. 1 and 2 runs offline. If, on the other hand, the optimization method were to run online, the starting parameters would be determined by actual values of the metallurgical plant and/or the units thereof. In this case, the starting parameters would therefore be read in directly from the metallurgical plant and thus be predetermined by the metallurgical plant.

In a step S6, the optimization computer 1 next determines initial time profiles for the media streams which the user 5 has predetermined as input operating parameters for the model 4, and predetermines them as input operating parameters for the model 4. In doing so, it of course takes into account the technological boundary conditions and dependent relationships with respect to operation of the units. Then, the model 4 is called up in step S7.

The optimization computer 1 then waits until the model 4—on the basis of calling up the model in step S7—has determined output operating parameters which describe the remaining media stream profiles. The optimization computer 1 receives these media stream profiles in a step S8. In the same step S8, the optimization computer 1 also receives end parameters which have been determined by the model 4 and describe end states of the units of the metallurgical plant after the period of time T.

In a step S9, the optimization computer 1 then determines a measure M for the quality of the predetermined and determined operating profile, i.e. all of the media stream profiles, of the metallurgical plant on the basis of the starting parameters and the assessment criterion K. To optimize the operating parameters, the optimization computer 1, in a step S10, checks, for example, whether the quality measure M which has been determined differs from a quality measure M' which was determined in the sequence immediately preceding it by more than a limit δ.

If the difference is greater than the limit δ, this is an indication that the operating parameters are still far from their optimum. On the other hand, if the change is only less than the limit δ, this is an indication that the optimum has been reached or substantially or sufficiently approached. Therefore, the method continues either with a step S11 or with steps S12 and S13, depending on the comparison result in step S10.

In step S11, the set of input operating parameters is varied in accordance with the optimization algorithm A defined by the user 5. The method then returns to step S7.

In step S12, the determined operating parameters which have been found to be good or optimum, as well as if appropriate also the determined quality measure M and the end states of the units, are output to the user 5. If appropriate, it is additionally also possible for the plant to be controlled directly. Then, in step S13, it is checked whether the optimization method needs to be run through again. If so, the method returns to step S5, and if not the running of the optimization method is terminated.

The mathematical model 4 and its operating sequence will now be explained in more detail in conjunction with FIG. 3.

Figure 3:
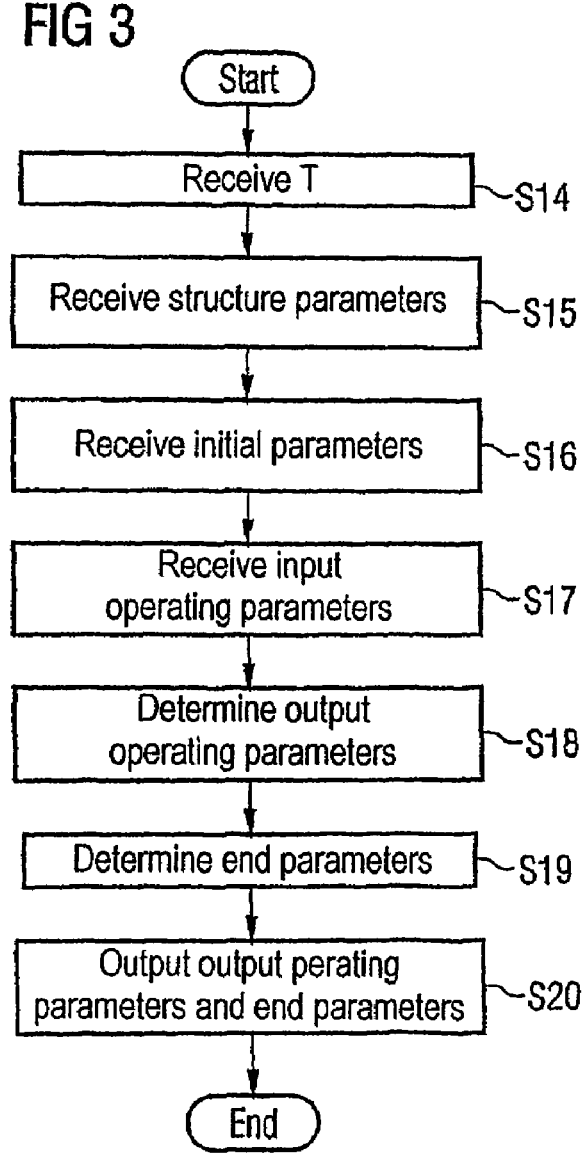
FIGS. 2 and 3 show examples of flow diagrams, FIG. 4 diagrammatically depicts a metallurgical plant and the media streams which occur therein.

In accordance with FIG. 3, the model 4 first of all receives the period of time T in a step S14. Then, in step S15, it receives the structure parameters. Furthermore, in step S16, it receives starting parameters for the units. Finally, in step S17 it receives the input operating parameters.

In steps S18 and S19, the model 4 determines the corresponding output operating parameters and the end parameters. In this case too, the technological boundary conditions and the dependent relationships with respect to the units are again taken into account. The output operating parameters and the end parameters are then output by the mathematical model 4 in step S20.

Figure 4:
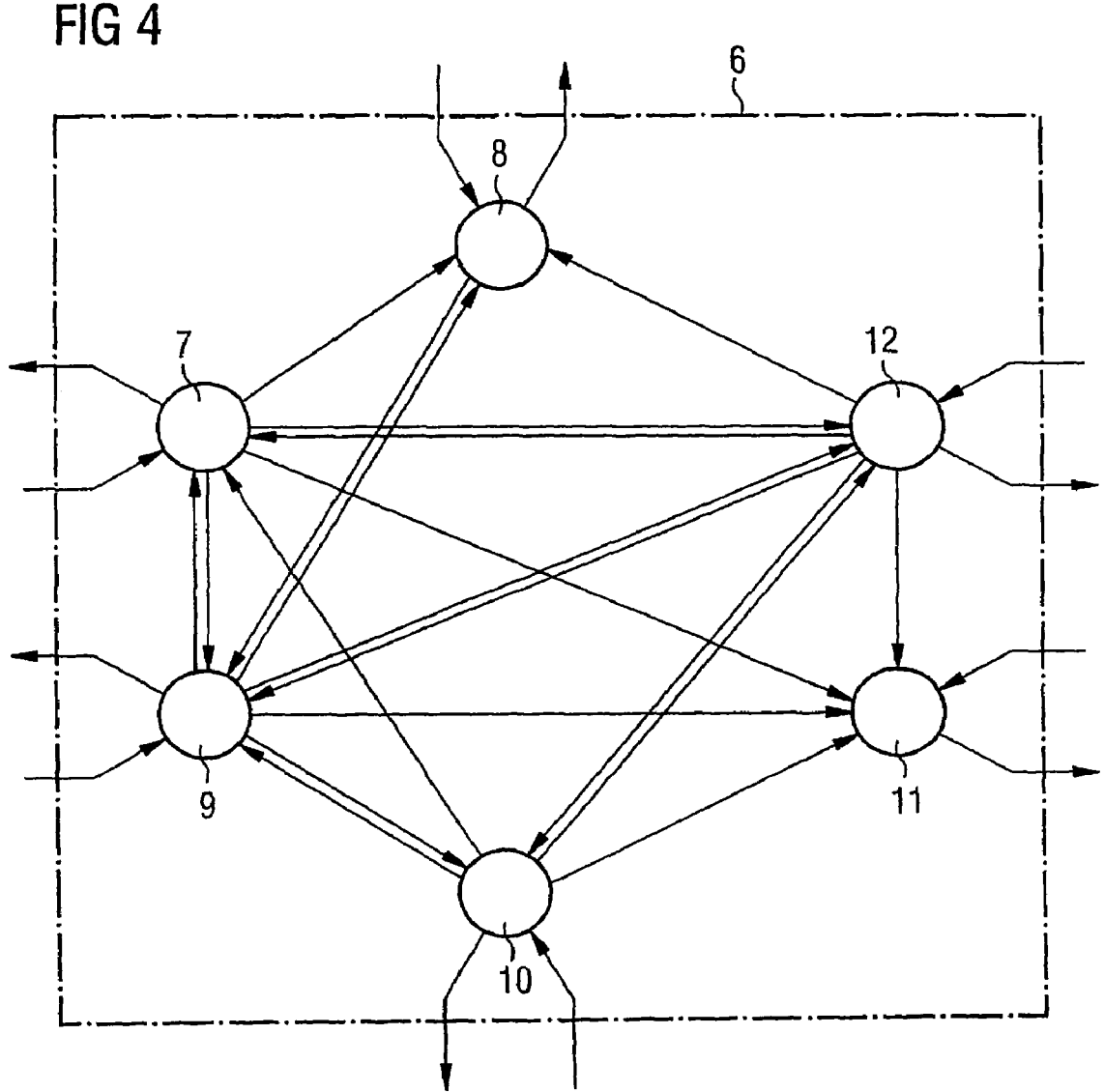

For a more detailed explanation of the optimization method presented in FIG. 2 and the sequence of the mathematical model presented in FIG. 3, it is assumed, by way of example, that the model 4 is to model a metallurgical plant 6 which is illustrated—diagrammatically and in simplified form—in FIG. 4.

In accordance with FIG. 4, the metallurgical plant 6 (shown by way of example) has 6 units 7 to 12. These are a coking plant 7, a sintering plant 8, a blast furnace 9, a steelworks 10, a rolling mill 11 and a power plant 12. As will be immediately and readily apparent from FIG. 4, each of the units 7 to 12 are assigned media streams to be supplied and discharged media streams. Both the units 7 to 12 and the media streams, as well as their time profiles, are, of course, modeled within the model 4.

By way of example, the coking plant 7 is supplied with the material stream "coal" as media stream. Depending on the time production and time demand, the energy carrier stream "coke" is discharged to the sintering plant 8 and the blast furnace 9. Furthermore, the energy carrier stream "coke furnace gas"—once again according to production and demand—is discharged to the sintering plant 8, the blast furnace 9, the rolling mill 11 and the power plant 12. The material streams "off-gas" and "pollutants" are discharged to outside the plant 6 (i.e. the environment). The off-gases comprise in particular carbon dioxide and carbon monoxide, and the pollutants comprise, for example, nitrogen oxides and sulfur oxides.

In a similar way, the material stream "iron ore" and—if necessary as an addition to the coke stream from the coking plant 7—the energy carrier stream "coke" are fed to the sintering plant 8 from the outside. The latter discharges sinter to the blast furnace 9. The power plant 12 supplies the sintering plant 8, if necessary, with the energy stream "electric power" and the energy carrier stream "steam". Furthermore, the sintering plant is if appropriate supplied by the coking plant 7 with the energy carrier stream "coke furnace gas" and by the blast furnace 9 with the energy carrier stream "furnace gas". The sintering plant 8 also discharges material streams, in particular once again pollutants and off-gases, to the environment.

The material stream "coke" and the energy carrier stream "natural gas" are fed to the blast furnace 9 from outside. The material streams "slag", "off-gas" and "pollutants" are discharged from it to the outside. Inside the plant, as has already been mentioned, it is supplied with coke and coke furnace gas from the coking plant 7 and with sinter from the sintering plant 8. Furnace gas is discharged by it—according to the situation and according to demand—to the coking plant 7, the sintering plant 8 and the power plant 12. Furthermore, if necessary, steam and electric power are fed to the blast furnace 9 from the power plant 12, and converter gas is fed to the blast furnace 9 from the steelworks 10. Moreover—as the primary purpose of the blast furnace 9—it discharges pig iron to the steelworks 10. The material streams "scrap" and "oxygen" are fed to the steelworks 10 from outside the metallurgical plant 6. Inside the plant, it is supplied with pig iron from the blast furnace 9 and with steam and electric current from the power plant. The steelwork 10 discharges slag, pollutants and off-gas to the outside. Inside the plant, the steelworks 10 discharges converter gas to the blast furnace 9, the coking plant 7, the rolling mill 11 and the power plant 12. Steel is discharged to the rolling mill 11.

Inside the plant, steel and converter gas from the steelworks 10 are fed to the rolling mill 11. The rolling mill 11 is also supplied with coke furnace gas from the coking plant 7 and with furnace gas from the blast furnace 9. Furthermore, the rolling mill 11 is supplied with electric power from the power plant 12. The end product (rolled steel) is discharged to the outside from the rolling mill 11.

The power plant 12 is supplied with electric current, natural gas and/or fuel oil from outside. Inside the plant, it is supplied with the combustible gases (coupled gases) produced by the coking plant 7, the blast furnace 9 and the steelworks 10. The power plant 12 discharges steam and electric power to the coking plant 7, the sintering plant 8, the blast furnace 9 and the steelworks 10. Furthermore, electric power is discharged to the rolling mill 11 and steam, off-gases and pollutants to the environment.

Therefore, as can be seen, the media streams between the units 7 to 12 comprise material streams (e.g. ore, slag and off-gas), energy carrier streams (e.g. natural gas, fuel oil and coke furnace gas) and energy streams (in particular steam and electric power). Furthermore, for each of the units 7 to 12, media streams which are to be fed to this unit 7 to 12 are fed to the respective unit 7 to 12 either from outside the plant 6 or from another of the units 7 to 12. Also, each media stream discharged from one of the units 7 to 12 is discharged either to outside the plant 6 or to another of the units 7 to 12.

Figure 5:
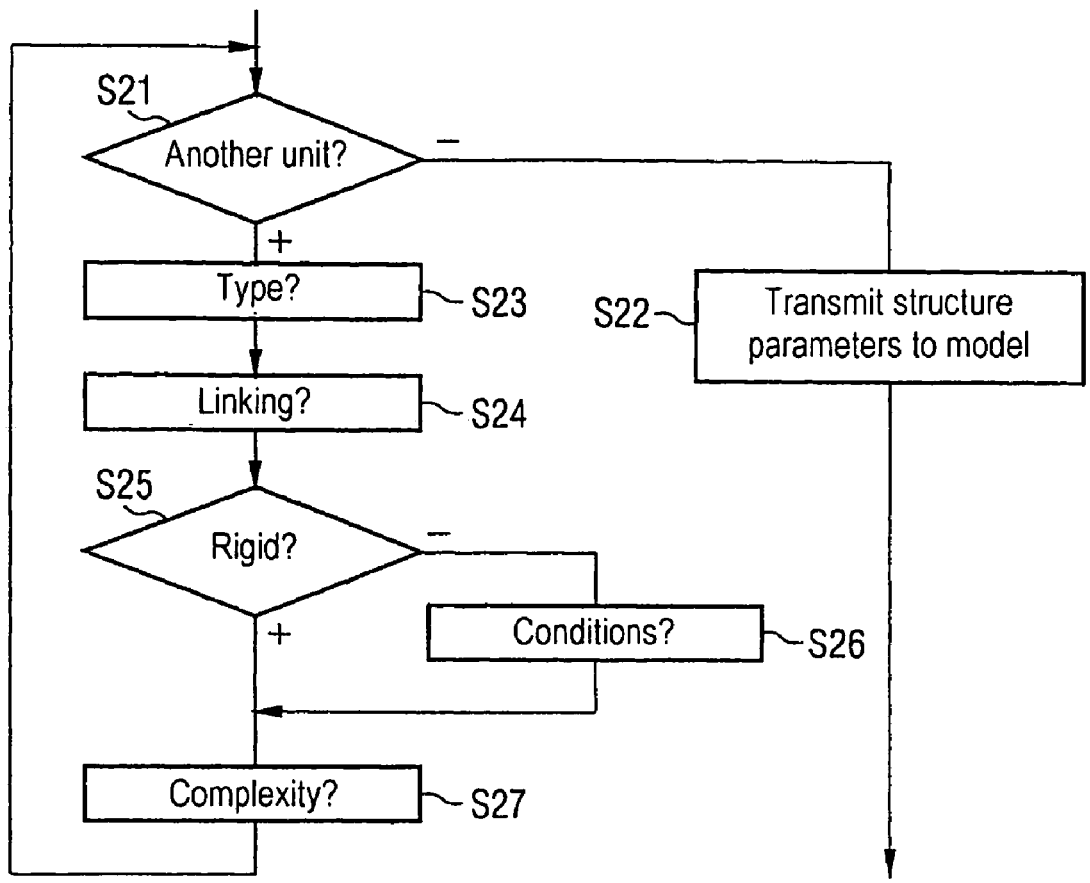
FIG. 5 shows a flow diagram.

To allow flexible modeling of a plant such as for example the metallurgical plant 6 illustrated in FIG. 4, in accordance with FIG. 5 step S3 (cf. FIG. 2) is divided into a number of steps. This is explained in more detail below in conjunction with FIG. 5.

In accordance with FIG. 5, as part of the implementation of step S3, first of all the user 5 is asked, in a step S21, if a unit 7 to 12 is to be input.

If not, the optimization computer 1, in a step S22, transmits the structure data which have been input thus far to the model 4. Then, in the model 4, a submodel for the respective unit 7-12 is selected and parameterized in accordance with the predetermined stipulations of the user 5. The details of the submodels themselves need not be dealt with in more detail in the context of the present invention, since these submodels are known per se. By way of example, reference is made to the two specialist articles cited in the introduction, as well as the doctoral thesis "Ein Modell zur produktionsabhängigen Prognose des Energiebedarfs eines Hüttenwerks mit dem Ziel der Energiekostenoptimierung" [A Model for the Production-dependent Forecasting of the Energy Consumption of a Metallurgical Plant with a View to Optimizing Energy Costs] by M. Reh at the University of Siegen, 1992, and to the specialist article "Mathematische Modellierung und Optimierung der Energieverteilung im integrierten Hüttenwerk", [Mathematical Modeling and Optimization of the Energy Distribution in Integrated Metalurgical Plants], VDI Research Reports, Series 6, Energieerzeugung No. 232, 1989.

Otherwise, in a step 23, the optimization computer 1 first of all asks the user 5 the nature of the unit 7 to 12 which is to be modeled. The nature comprises, for example, the type of unit 7 to 12 its technical parameters and its media streams.

Then, in a step S24, the optimization computer 1 asks the user 5 which of the units 7 to 12 which have already been predetermined the newly input unit 7 to 12 is to be linked to. It therefore asks which media streams are discharged from the newly input unit 7 to 12 to which of the other units 7 to 12 and which media streams are received from the other units 7 to 12 that have already been defined. Media streams which are not linked within the plant are assumed to be received from the outside or discharged to the outside. The computer then asks, in a step S25, whether this linking in accordance with step S24 is to be rigid or flexible. If the user 5 desires flexible linking, in a step S26 the optimization computer 1 asks what links are to be made under what conditions (e.g. completely freely).

Each submodel is a generalized representation of the true unit 7 to 12. The extent of the generalization may be stronger or weaker. Therefore, it is preferable also to ask, in a step S27, which submodel is to be used to model the newly predetermined unit 7 to 12. By way of example, the user 5 can select a simple submodel, a complicated submodel and a medium submodel for each type of unit. Step S27 may if appropriate be brought forward to immediately before step S23, since—depending on the particular configuration of the models—the steps S24 to S21 can be input as a function of complexity.

Then, from step S27, the method returns to step S21. It is in this way possible to realize a plant 6—in principle any desired plant 6—with a number of units 7 to 12 which can be selected as desired and in which, furthermore, the links between the individual units 7 to 12 can be predetermined to be rigid or flexible.

With regard to the linking of the individual units 7 to 12 to one another, it is also possible for them not to be asked of the user 5, but rather assumed to be completely flexible. In this case, the individual units 7 to 12 can initially be modeled independently of one another. A model calculation for the individual units 7 to 12 then first of all gives the time profiles of the media streams for the individual units 7 to 12 and their end states. The balance of the time profiles of the media streams for all the units 7 to 12 then gives the time profiles for the media streams to be supplied from the outside and the time profiles of the media streams discharged to the outside. Therefore, the quality criterion M can be assigned to a specific operating procedure on the basis of the assessment criterion K and the time profiles of the media streams with an external effect (media streams supplied from outside and media streams released to the outside).

It is preferable for the operating parameters to include not just quantity profiles for the respective media streams, but if appropriate also quality profiles for the respective media streams. This is diagrammatically depicted in FIG. 6 for the example "iron ore".

Figure 6:
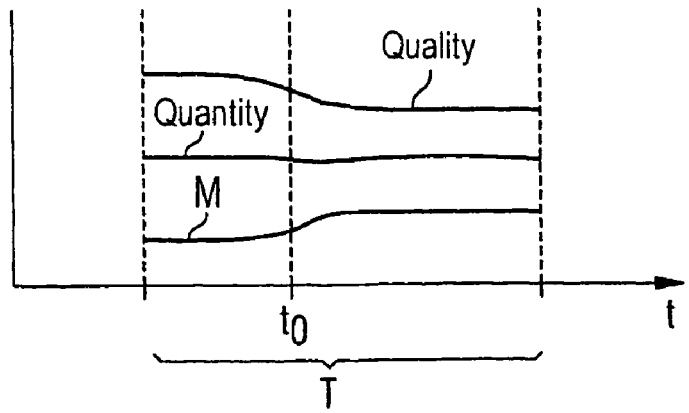
FIGS. 6 to 8 show time diagrams.

In accordance with FIG. 6, the quantity of iron ore with which the sintering plant 8 is supplied at an instant to is maintained but the quality of the iron ore is reduced. On the condition that all the other media streams can remain unchanged, in this case the quality measure M rises.

Figure 7:
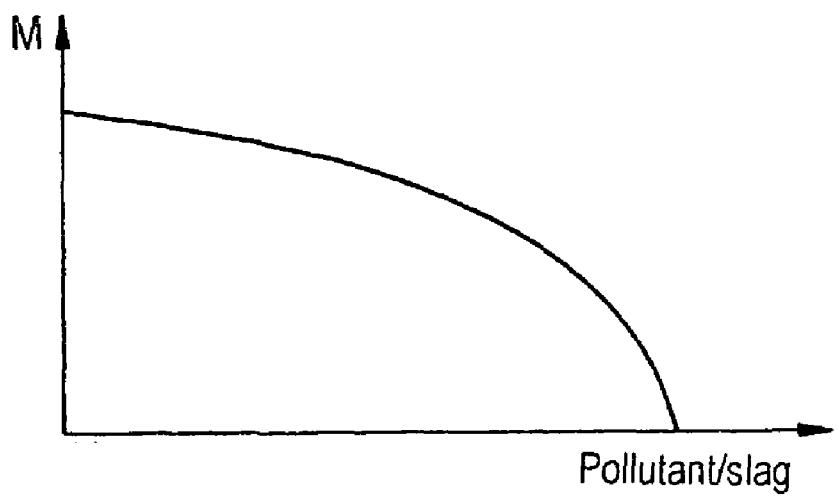

The better the operation of the installation, the greater the quality measure M. If, for example—with the other parameters maintained—the release of finished steel from the metallurgical plant 6 rises, the quality measure M also rises. However, in accordance with FIG. 7, it is also possible for the quality measure M to rise if one of the media stream profiles discharged to outside the plant 6 drops. This applies in particular to the material streams "slag", "off-gases" and "pollutants".

Figure 8:
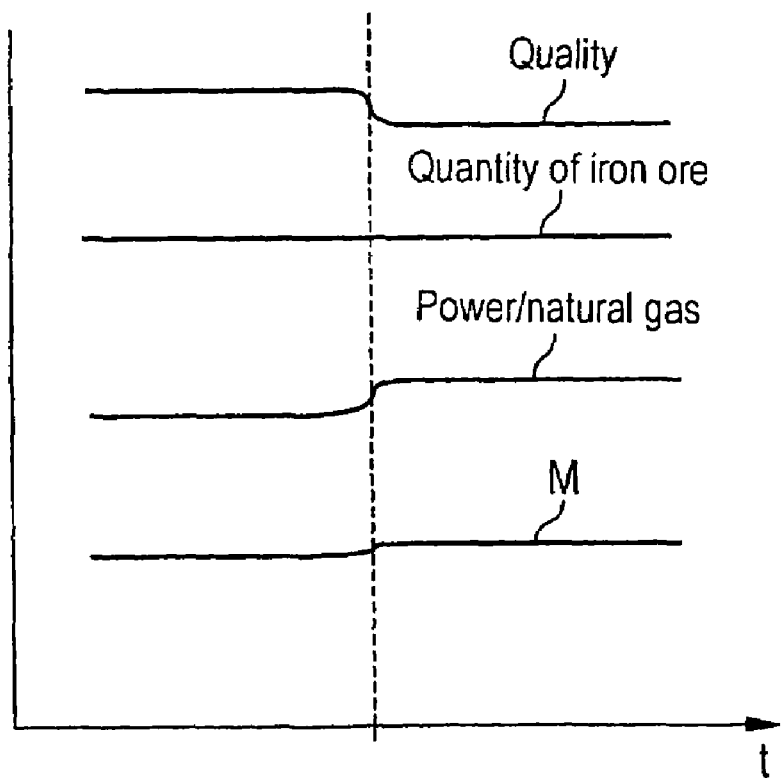

It has been stated above that—in particular for material streams—the quality measure M can rise if a quality profile of a material stream supplied from outside the plant 6 drops. However, one individual parameter cannot usually be considered on its own. As a corollary, it is generally the case that at least one further media stream profile will also be varied. In particular, in accordance with FIG. 8, it is possible that if the ore quality drops, the energy required will rise, i.e. one of the energy carrier streams or one of the energy streams rises as a corollary. Depending on the weighting of the two media streams, it is in this case possible as a result for the assessment criterion K to be satisfied better than hitherto, i.e. the quality measure M rises.

Of course, a wide range of modifications to the invention described above are possible. In particular, it is possible for the mathematical model 4 to be used independently of the corresponding optimization method. By way of example, the model 4 can be used in isolation as part of a simple forecast, i.e. without automatic optimization. This can be used in particular for testing or optimizing the model 4 itself. It is also possible for the optimization to be switched off, e.g. by a suitable selection being preset by the user 5. Furthermore, it is possible for the results to be output to an operator of the plant 6 (=the user 5), so that if necessary the operator can then intervene in operation of the metallurgical plant 6. The extensive parameterization offered in accordance with the invention means that the optimization method and the model 4 can, however, be almost universally employed. This is true in particular if "waste heat" is additionally also taken into account as a media stream discharged to the outside.

What is claimed is:

1. A method for optimizing the operation of a metallurgical plant using a model, comprising the steps of:
   modeling a number of units of the metallurgical plant to which to be supplied and discharged media streams are assigned;
   predetermining structure parameters to an optimization computer by a user and transmitting the parameters from the optimization computer to the model, the structure parameters defining at least the number and type of the units as variables for the model;
   predetermining a linking of the media streams on the basis of the structure parameters, in such a manner that each media stream which is to be fed to one of the units is fed to the respective unit either from outside the plant or from another of the units, and each media stream discharged by one of the units is discharged either to outside the plant or to another of the units;

predetermining starting parameters which describe initial states of the units as variables for the model;

predetermining input operating parameters, which describe a first part of the media stream profiles, as variables for the model;

determining and outputting output operating parameters, which describe the remainder of the media stream profiles, by the model;

determining and outputting end parameters, which describe end states of the units, by the model;

predetermining an assessment criterion that provides a relative priority of at least one measurable characteristic related to the operation of the metallurgical plant;

predetermining at least one unit of the metallurgical plant to be flexibly linked to at least one other unit via one or more media streams, and predetermining conditions for such flexible linking to be used as input by the model; and determining optimized operating parameters by the optimization computer on the basis of the starting parameters and the assessment criterion in accordance with an optimization algorithm using the model.

2. A method according to claim 1, wherein the user predetermines to the optimization computer which of the media stream profiles are input operating parameters and which are output operating parameters.

3. A method according to claim 1, wherein the assessment criterion can be predetermined in such a manner that, for at least one media stream profile which is discharged to outside the plant, it is satisfied more successfully the lower this media stream profile.

4. A method according to claim 3, wherein this media stream profile is a material stream.

5. A method according to claim 1, wherein the assessment criterion can be predetermined in such a manner that it is satisfied more successfully if a quality profile of a first media stream profile fed to the plant from outside drops and, as a corollary to this, a second media stream profile fed to the plant from outside increases on account of the drop in the quality profile of the first media stream profile.

6. A method according to claim 5, wherein the first media stream profile is a material stream profile, and the second media stream profile is an energy or energy carrier stream profile.

7. A method according to claim 6, wherein the optimization algorithm is predetermined to the optimization computer by the user.

8. A method according to claim 1, wherein a period of time is predetermined to the optimization computer by the user and is transmitted by the optimization computer to the model.

9. A computer program stored on a tangible data carrier for optimizing the operation of a metallurgical plant using a model, the computer program configured to, when executed by a computer processor:

model a number of units of the metallurgical plant to which to be supplied and discharged media streams are assigned;

predetermine structure parameters to an optimization computer by a user and transmitting the parameters from the optimization computer to the model, the structure parameters defining at least the number and type of the units as variables for the model;

predetermining a linking of the media streams on the basis of the structure parameters, in such a manner that each media stream which is to be fed to one of the units is fed to the respective unit either from outside the plant or from another of the units, and each media stream discharged by one of the units is discharged either to outside the plant or to another of the units;

predetermine starting parameters which describe initial states of the units as variables for the model;

predetermine input operating parameters, which describe a first part of the media stream profiles, as variables for the model;

determine and outputting output operating parameters, which describe the remainder of the media stream profiles, by the model;

determine and outputting end parameters, which describe end states of the units, by the model;

predetermine an assessment criterion that provides a relative priority of at least one measurable characteristic related to the operation of the metallurgical plant;

predetermining at least one unit of the metallurgical plant to be flexibly linked to at least one other unit via one or more media streams, and predetermining conditions for such flexible linking to be used as input by the model; and determine optimized operating parameters by the optimization computer on the basis of the starting parameters and the assessment criterion in accordance with an optimization algorithm using the model.

10. An optimization computer which is programmed in such a manner that it can be used to carry out a method for optimizing the operation of a metallurgical plant using a model, comprising the steps of:

modeling a number of units of the metallurgical plant to which to be supplied and discharged media streams are assigned;

predetermining structure parameters to an optimization computer by a user and transmitting the parameters from the optimization computer to the model, the structure parameters defining at least the number and type of the units as variables for the model;

predetermining a linking of the media streams on the basis of the structure parameters, in such a manner that each media stream which is to be fed to one of the units is fed to the respective unit either from outside the plant or from another of the units, and each media stream discharged by one of the units is discharged either to outside the plant or to another of the units;

predetermining starting parameters which describe initial states of the units as variables for the model;

predetermining input operating parameters, which describe a first part of the media stream profiles, as variables for the model;

determining and outputting output operating parameters, which describe the remainder of the media stream profiles, by the model;

determining and outputting end parameters, which describe end states of the units, by the model;

predetermining an assessment criterion that provides a relative priority of at least one measurable characteristic related to the operation of the metallurgical plant;

predetermining at least one unit of the metallurgical plant to be flexibly linked to at least one other unit via one or more media streams, and predetermining conditions for such flexible linking to be used as input by the model; and determining optimized operating parameters by the optimization computer on the basis of the starting parameters and the assessment criterion in accordance with an optimization algorithm using the model.

* * * * *